(12) United States Patent
Kato

(10) Patent No.: US 8,173,292 B2
(45) Date of Patent: May 8, 2012

(54) SOLID BATTERY AND A METHOD FOR MANUFACTURING AN ELECTRODE THEREOF

(75) Inventor: Takashi Kato, Sagamihara (JP)

(73) Assignee: Ohara Inc., Sagamihara-shi (JP)

( * ) Notice: Subject to any disclaimer, the term of this patent is extended or adjusted under 35 U.S.C. 154(b) by 437 days.

(21) Appl. No.: 12/363,050

(22) Filed: Jan. 30, 2009

(65) Prior Publication Data

US 2009/0197183 A1    Aug. 6, 2009

Related U.S. Application Data

(60) Provisional application No. 61/025,899, filed on Feb. 4, 2008.

(30) Foreign Application Priority Data

Jan. 31, 2008    (JP) ................ 2008-021156

(51) Int. Cl.
*H01M 6/02*    (2006.01)
(52) U.S. Cl. ........ 429/128; 429/124; 429/465; 429/466; 429/497; 429/535
(58) Field of Classification Search ............. 429/124, 429/128, 465, 466, 497, 535
See application file for complete search history.

(56) References Cited

U.S. PATENT DOCUMENTS

| | | | | |
|---|---|---|---|---|
| 5,962,163 A | * | 10/1999 | Urry | 429/164 |
| 6,197,449 B1 | * | 3/2001 | Hoffmann et al. | 429/233 |
| 6,824,907 B2 | * | 11/2004 | Sarkar et al. | 429/452 |
| 2007/0048619 A1 | | 3/2007 | Inda | |

FOREIGN PATENT DOCUMENTS

| | | |
|---|---|---|
| EP | 0459451 A2 | 12/1991 |
| WO | 02/43168 A2 | 5/2002 |

OTHER PUBLICATIONS

European Search Report dated Dec. 15, 2011, issued in corresponding European Patent Application No. 09151701.

* cited by examiner

*Primary Examiner* — Stuart Hendrickson
(74) *Attorney, Agent, or Firm* — Westerman, Hattori, Daniels & Adrian, LLP

(57) ABSTRACT

A solid battery includes at least either one of a positive electrode and a negative electrode comprising bars of an active material of the electrode and bars of a solid electrolyte of the electrode arranged alternately in such a manner that each of the bars of the active material of the electrode is disposed adjacent to each of the bars of the solid electrolyte of the electrode, and a solid electrolyte constituting a separator and having a plane to which the bars of the active material and the bars of the solid electrolyte of the electrode are disposed in a crossing direction. There is also provided a method for manufacturing an electrode of such solid battery.

17 Claims, 4 Drawing Sheets

SOLID BATTERY AND A METHOD FOR MANUFACTURING AN ELECTRODE THEREOF

BACKGROUND OF THE INVENTION

This invention relates to a solid battery and a method for manufacturing an electrode of a solid battery. The electrode is useful as a positive electrode or a negative electrode of a fully solid type lithium ion battery.

As electronic devices such as mobile phones tend to be made compact and have upgraded functions, requirements for a battery which is a power source in such devices tend to become upgraded. Particularly, development has been made for providing a lithium ion battery having a high energy density.

An electrolyte which is made by impregnating a porous film called a separator with a non-aqueous electrolyte has been generally used as an electrolyte in a lithium ion secondary battery. Recently, instead of such electrolyte using mainly liquid, a lithium ion secondary battery (polymer battery) using a polymer electrolyte made of a polymer has been developed.

Further, as disclosed in Japanese Patent Application Laid-open Publications Hei 6-140052 and 2004-348972, there have been reports about assembly of a lithium ion secondary battery by using a solid electrolyte which is added with an inorganic oxide such as alumina in an electrolyte to improve mechanical strength and by using a fully solid electrolyte which is made by pressing a solid inorganic substance such as sulfide glass to pellets. Since these solid electrolytes do not use a combustible organic solvent such as an electrolytic solution, there is no danger of leakage or combustion and therefore these solid electrolytes are excellent from the standpoint of safety.

In the case of such a fully solid battery, all of a positive electrode, an electrolyte and a negative electrode are solid. As shown schematically in FIG. 4, in such fully solid battery 1, a positive electrode 2 and a negative electrode 3 are stacked together via a solid electrolyte 4 constituting a separator, and a positive electrode current collector 5 is provided on the outer surface of the positive electrode 2 and a negative electrode current collector 6 is provided on the outer surface of the negative electrode 3. These electrodes 2 and 3 are made, for example, by mixing powdery active materials 2a and 3a of the electrode with powdery electrolytes 2b and 3b to form a slurry, forming this slurry to a film and drying and sintering the film.

Such electrode 2 has a disorderly structure in which the active material 2a of the electrode and the electrolyte 2b of the electrode are mixed randomly and, since there is no orderly path for ion in the electrode 2, ion must pass through a long, disorderly path with the result that it takes a long period of time for a battery reaction and therefore it is difficult to provide a battery having a high current output. Further, since distance of diffusion of ion and electron in the active material 2a of the electrode is long, it is difficult to obtain a high current density.

It is, therefore, an object of the invention to provide a solid battery having a high current output and providing a high current density by improving an arrangement of the active material of the electrode and the electrolyte of the electrode which constitute the electrode.

It is also an object of the invention to provide a method for manufacturing an electrode of such improved battery.

SUMMARY OF THE INVENTION

As a result of studies and experiments made by the inventor of the present invention about an electrode of a lithium ion solid battery, it has been found, which has led to the present invention, that by arranging an active material of an electrode and an electrolyte of the electrode adjacent to each other without mixing them together, a moving path of ion can be shortened and, by adjusting powdery state of the active material of the electrode, distances of diffusion of ion and electron in the active material of the electrode can be also shortened.

For achieving the above described objects of the invention, in the first aspect of the invention, there is provided a solid battery comprising:

a positive electrode;
a negative electrode; and
a solid electrolyte constituting a separator;
at least either one of said positive electrode and negative electrode comprising:
bars of an active material of the electrode; and
bars of a solid electrolyte of the electrode,
the bars of the active material of the electrode being in contact at least with a current collector,
the bars of the solid electrolyte of the electrode being in contact at least with the solid electrolyte constituting a separator,
the bars of the active material of the electrode and the bars of the solid electrolyte of the electrode being arranged alternately in such a manner that each of the bars of the active material of the electrode is disposed adjacent to each of the bars of the solid electrolyte of the electrode, and
the bars of the active material of the electrode and the bars of the solid electrolyte of the electrode being disposed in a crossing direction to a plane of the solid electrolyte constituting a separator.

In the present specification, the phrasing "disposed in a crossing direction" means that the bars are disposed in a non-parallel direction with respect to the plane of the solid electrolyte constituting the separator.

In the present specification, the term "average particle diameter" means a value of diameter of accumulated volume ratio of 50% as measured by the laser diffraction method.

According to this aspect of the invention, since in an electrode comprising bars of an active material of the electrode and bars of a solid electrolyte of the electrode, these bars are arranged alternately in such a manner that each of the bars of the active material of the electrode is disposed adjacent to each of the bars of the solid electrolyte of the electrode and the bars of the active material and the bars of the solid electrolyte of the electrode are disposed in a crossing direction to a plane of a solid electrolyte constituting a separator, the moving path of ion and the moving path of electron can be separated from each other and can be shortened and, therefore, time required for the battery reaction can be shortened, a high current density can be provided and a solid battery of high current output can be provided.

In the second aspect of the invention, the bars of the active material of the electrode and the bars of the solid electrolyte of the electrode have a rectangular or a trapezoidal cross section which is constant or changes in the axial direction of the bars. By adopting such arrangement, the moving paths of ion and electron can be more surely secured.

In the third aspect of the invention, there is provided a solid battery as defined in the first or second aspect wherein the bars of the active material of the electrode and the bars of the solid electrolyte of the electrode are arranged perpendicularly to the plane of the solid electrolyte constituting the separator.

According to this aspect of the invention, since the bars of the active material of the electrode and the bars of the solid electrolyte of the electrode are arranged perpendicularly to the plane of the solid electrolyte constituting the separator, the moving paths of ion and electron can be made shortest whereby time required for the battery reaction can be further shortened, a higher current density can be obtained and a solid battery of a higher current output can be provided.

In the fourth aspect of the invention, there is provided a solid battery as defined in any of the first to third aspects wherein the bars of the active material of the electrode occupies the ratio of 50 vol % or over in the total volume of the bars of the active material of the electrode and the bars of the solid electrolyte of the electrode.

According to this aspect of the invention, since the bars of the active material of the electrode occupies the ratio of 50 vol % or over in the total volume of the bars of the active material of the electrode and the bars of the solid electrolyte of the electrode, a solid battery in which the moving paths of ion and electron can be surely secured to provide a high current density and a high current output. The ratio of the active material is more preferably 60 vol % or over and most preferably 65 vol % or over. On the other hand, for preventing the moving path of ion from exercising influence to the performance of the battery, the bars of the active material of the electrode should occupy the ratio of 97 vol % or below, more preferably 95 vol % or below and most preferably 90 vol % or below to the total volume of the bars of the active material of the electrode and the bars of the solid electrolyte of the electrode.

In the fifth aspect of the invention, there is provided a solid battery as defined in any of the first to fourth aspects wherein the bars of the active material of the electrode are each composed of particles having an average particle diameter of 1 μm or below.

According to this aspect of the invention, since the bars of the active material of the electrode are each composed of particles having an average particle diameter of 1 μm or below, the distances of dispersion of ion and electron in the active material of the electrode can be shortened whereby the moving paths of ion and electron can be improved, a high current density can be obtained and a solid battery having a high current output can be provided. The average particle diameter is more preferably 0.7 μm or below and most preferably 0.5 μm or below.

On the other hand, for obtaining high performance of the active material, an average particle diameter of the bars of the active material of the electrode should be preferably 0.01 μm or over, more preferably 0.03 μm or over and most preferably 0.05 μm or over. By adopting such average particle diameter, the distances of diffusion of ion and electron in the active material of the electrode can be further shortened whereby the moving paths of ion and electron can be further improved, a higher current density can be obtained and a solid battery having a higher output can be provided.

In the sixth aspect of the invention, there is provided a solid battery as defined in any of the first to fifth aspects wherein the bars of the electrolyte of the electrode each has a maximum width within a range from 0.03 μm to 60 μm in cross section.

In terms of the ion conduction path, the broader the width of the solid electrolyte of the electrode is, the better. In terms of capacity of the battery, however, the narrow is the width of the solid electrolyte of the electrode is, the better. The width of the solid electrolyte should be more preferably 40 μm or below and most preferably 20 μm or below. From the standpoint of ion conductivity in the electrode, a too narrow width of the solid electrolyte hampers smooth ion conduction resulting imposing limitation to the length of the bars of the active material from the electrolyte 13 and thereby exercising an adverse effect to the capacity of the battery. Therefore, the width of the solid electrolyte should be preferably 0.05 μm or over and more preferably 0.1 μm or over.

In the seventh aspect of the invention, there is provided a solid battery as defined in any of the first to fifth aspects wherein the bars of the active material of the electrode each has a maximum width within a range from 0.1 μm to 60 μm in cross section.

The narrower is the width of the bars of the active material in cross section, diffusion of ion into the inside of the active material progresses in a shorter time and the moving path of electron from the inside of the particles of the active material to a current collector can be further shortened. Therefore, the width should be more preferably 40 μm or below and most preferably 30 μm or below. From the standpoint of the capacity of the battery, the more is the amount of filling of the active material into the electrode, the better, and, therefore, the width should be more preferably 0.2 μm or over, most preferably 0.3 μm or over.

The term "maximum width" of the bars in cross section means a width of a portion where a width of one bar in cross section becomes maximum in a part where a bar of the active material of the electrode is disposed adjacent to a bar of the electrolyte of the electrode. In a case where, as in bars of an active material of the electrode 16 in FIG. 2 which are continuous in the bottom portion, the width of this portion is not included.

In the eighth aspect of the invention, there is provided a solid battery as defined in any of the first to fifth aspects and the seventh aspect wherein the bars of the active material of the electrode comprise an electron conducting material.

By comprising an electron conducting material, the bars of the active material of the electrode are imparted with a better electron conducting property.

In the ninth aspect of the invention, there is provided a solid electrolyte as defined in any of the first to sixth aspects wherein the solid electrolyte of the electrode and the solid electrolyte constituting the separator are lithium ion conductive solid electrolytes.

By using lithium ion conductive solid electrolytes as the solid electrolyte of the electrode and the solid electrolyte constituting the separator, a high current density can be derived and a solid battery having a high current output can be provided. Such lithium ion conductive solid electrolyte should preferably comprise crystals of $Li_{1+x+z}M_x(Ge_{1-y}Ti_y)_{2-x}Si_zP_{3-z}O_{12}$ where $0 \leq x \leq 0.8$, $0 \leq y \leq 1.0$ and $0 \leq z \leq 0.6$, M is one or both of Al and Ga, or comprise glass-ceramics comprising crystals of $Li_{1+x+z}M_x(Ge_{1-y}Ti_y)_{2-x}Si_zP_{3-z}O_{12}$ where $0 \leq x \leq 0.8$, $0 \leq y \leq 1.0$ and $0 \leq z \leq 0.6$, M is one or both of Al and Ga.

The solid battery of the invention can be used as a lithium ion secondary battery.

In the thirteenth aspect of the invention, there is provided a method for manufacturing an electrode of a solid battery comprising bars of an active material of the electrode and bars of a solid electrolyte of the electrode arranged alternately in such a manner that each of the bars of the active material of the electrode is disposed adjacent to each of the bars of the solid electrolyte of the electrode, the bars of the active material and the bars of the solid electrolyte of the electrode are disposed in a crossing direction to a plane of a solid electrolyte constituting a separator, said method comprising steps of:

forming a slurry of the active material of the electrode and a slurry of the electrolyte of the electrode respectively in the shape of a bar alternately and adjacent to each other;

drying the slurries; and tightening the slurries.

According to this aspect, by forming a slurry of the active material of the electrode and a slurry of the electrolyte of the electrode respectively in the shape of a bar alternately and adjacent to each other, drying the slurries and tightening the slurries, an electrode of a solid battery in which the alternately arranged bars of the active material of the electrode and bars of the electrolyte of the electrode are disposed in a crossing direction to the plane of the electrolyte constituting the separator can be easily produced.

In the fourteenth aspect of the invention, there is provided a method for manufacturing an electrode of a solid battery comprising bars of an active material of the electrode and bars of a solid electrolyte of the electrode arranged alternately in such a manner that each of the bars of the active material of the electrode is disposed adjacent to each of the bars of the solid electrolyte of the electrode, the bars of the active material and the bars of the solid electrolyte of the electrode are disposed in a crossing direction to a plane of a solid electrolyte constituting a separator, said method comprising steps of:

forming a slurry of the active material of the electrode and a slurry of the electrolyte of the electrode respectively in the shape of a bar alternately and adjacent to each other on a release film;

drying the slurries; and stacking the bars of the active materials of the electrode and the bars of the electrolyte of the electrode formed alternately and adjacent to each other to a stack;

tightening the stack of the bars; and cutting the stack of the bars to form the electrode.

According to this aspect, by forming a slurry of the active material of the electrode and a slurry of the electrolyte of the electrode respectively in the shape of a bar alternately and adjacent to each other, forming a slurry of the active material of the electrode and a slurry of the electrolyte of the electrode respectively in the shape of a bar alternately and adjacent to each other on a release film; drying the slurries; and stacking the bars of the active materials of the electrode and the bars of the electrolyte of the electrode formed alternately and adjacent to each other to a stack, an electrode of a solid battery in which the alternately arranged bars of the active material of the electrode and bars of the electrolyte of the electrode are disposed in a crossing direction to the plane of the electrolyte constituting the separator can be easily produced. Accordingly, the moving path of ion and the moving path of electron can be separated from each other and can be shortened and, as a result, time required for the battery reaction can be shortened, a high current density can be derived and an electrode of a solid battery having a high current output can be provided.

In the fifteenth aspect of the invention, there is provided a method for manufacturing an electrode of a solid battery as defined in the fourteenth aspect wherein said stacking the bars of the active materials of the electrode and the bars of the electrolyte of the electrode formed alternately and adjacent to each other to a stack is made in such a manner that one layer of rows of the bars is superposed upon another layer of the rows of the bars by folding back or rolling the rows of the bars.

According to this aspect of the invention, by stacking the bars of the active materials of the electrode and the bars of the electrolyte of the electrode in such a manner that one layer of rows of the bars is superposed upon another layer of the rows of the bars by folding back or rolling the rows of the bars, the alternate arrangement of the bars of the active material and the bars of the electrolyte which are disposed adjacent to each other can be made easily and, by cutting the stack, an electrode of a solid battery in which the alternately arranged bars of the active material of the electrode and bars of the electrolyte of the electrode are disposed in a crossing direction to the plane of the electrolyte constituting the separator can be easily produced.

In the sixteenth aspect of the invention, there is provided a method for manufacturing an electrode of a solid battery as defined in the fourteenth or fifteenth aspect wherein forming of the bars alternately and adjacent to each other on the release film is made by printing.

According to this aspect of the invention, by forming the bars alternately and adjacent to each other on the release film by printing, the area of the bars can be reduced and, as a result, a high performance electrode can be produced easily.

In the seventeenth aspect of the invention, there is provided a method for manufacturing en electrode of a solid battery as defined in any of the fourteenth to sixteenth aspects wherein the slurries of the active material of the electrode are tightened by heat treating the slurries comprising particles having an average particle diameter of 1 μm or below.

According to this aspect of the invention, by tightening the slurries of the active material of the electrode by heat treating the slurries comprising particles having an average particle diameter of 1 μm or below, distances of diffusion of ion and electron can be shortened and conduction paths of ion and electron can thereby be improved and, therefore, a high current density can be obtained and a solid battery having a high current output can be provided.

BRIEF DESCRIPTION OF THE DRAWINGS

In the accompanying drawings,

FIG. 1 shows an embodiment of the solid battery of the invention in which

DESCRIPTION OF PREFERRED EMBODIMENTS

Preferred embodiments of the invention will now be described with reference to the accompanying drawings. In the following description, various limitations are made about specific examples but the scope of the invention is in no way limited by such description unless particularly referred to.

Figure 1A:
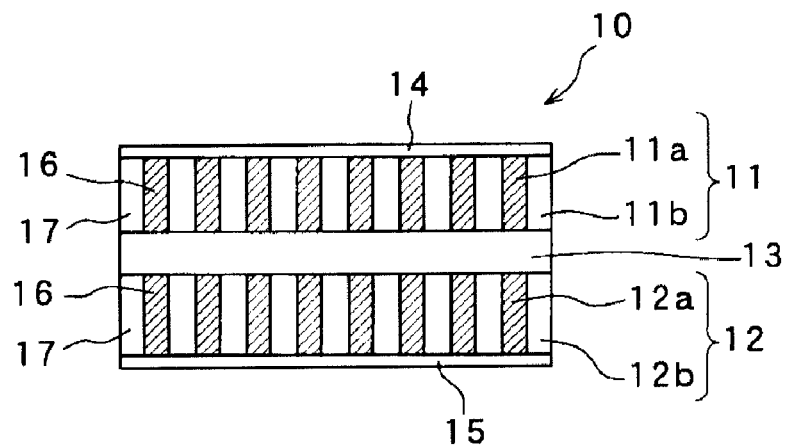
FIG. 1A is a schematic sectional view and FIG. 1B shows an enlarged part of FIG. 1A.
Figure 1B:
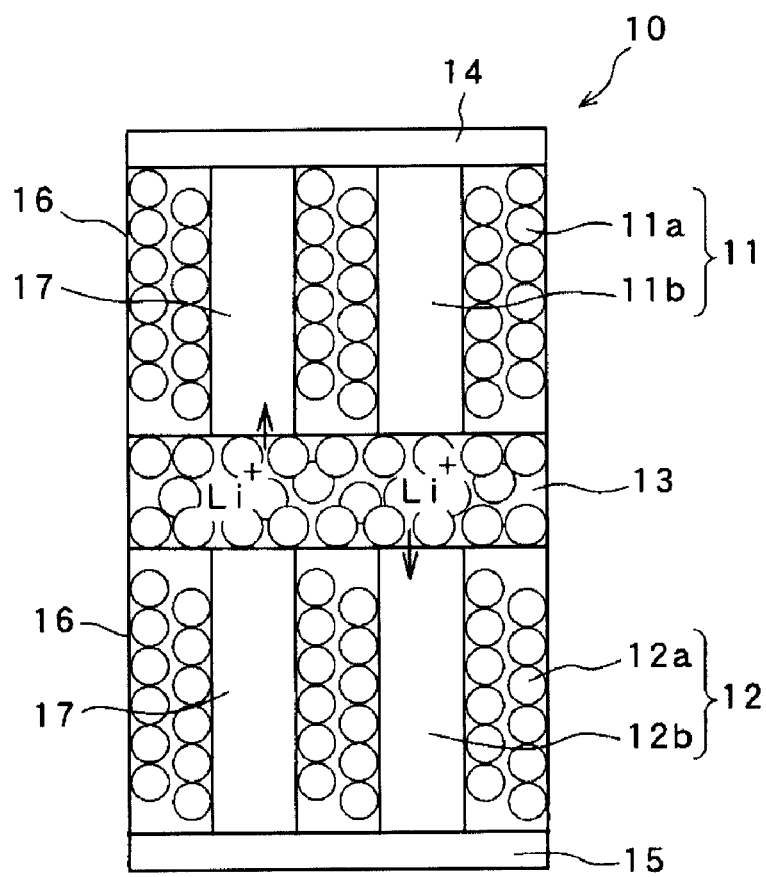
Figure 2:
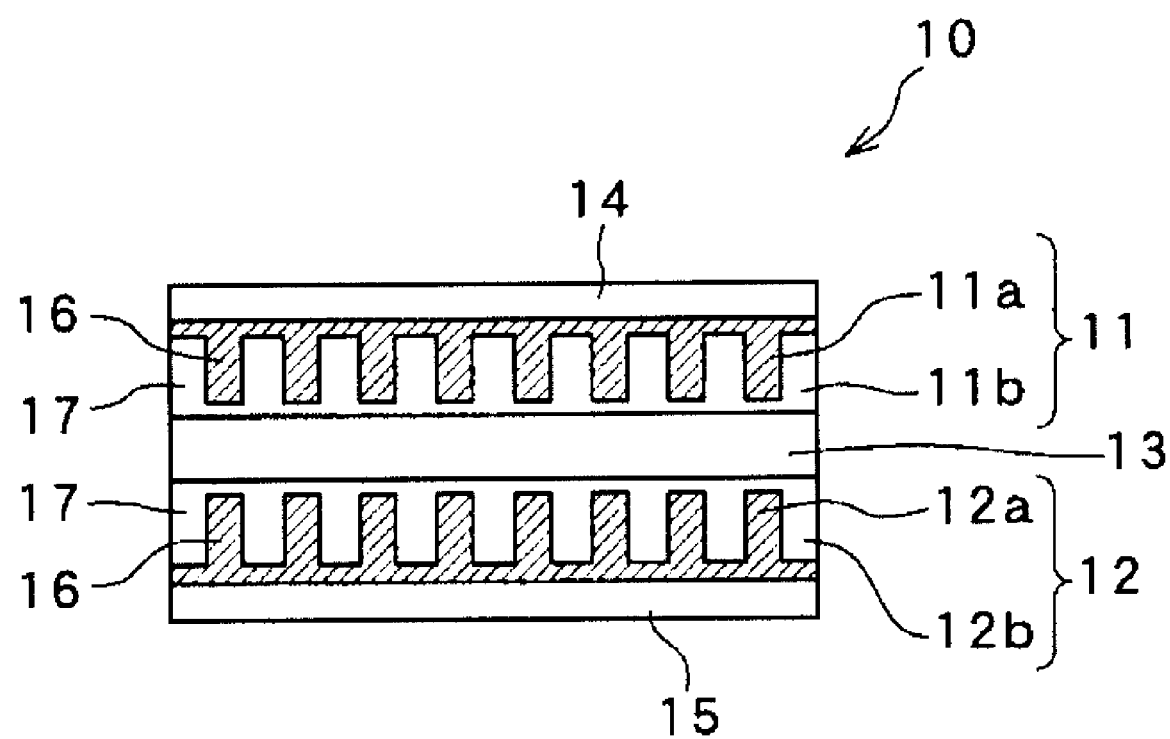
FIG. 2 is a schematic section showing another embodiment of the solid battery of the invention.
Figure 3:
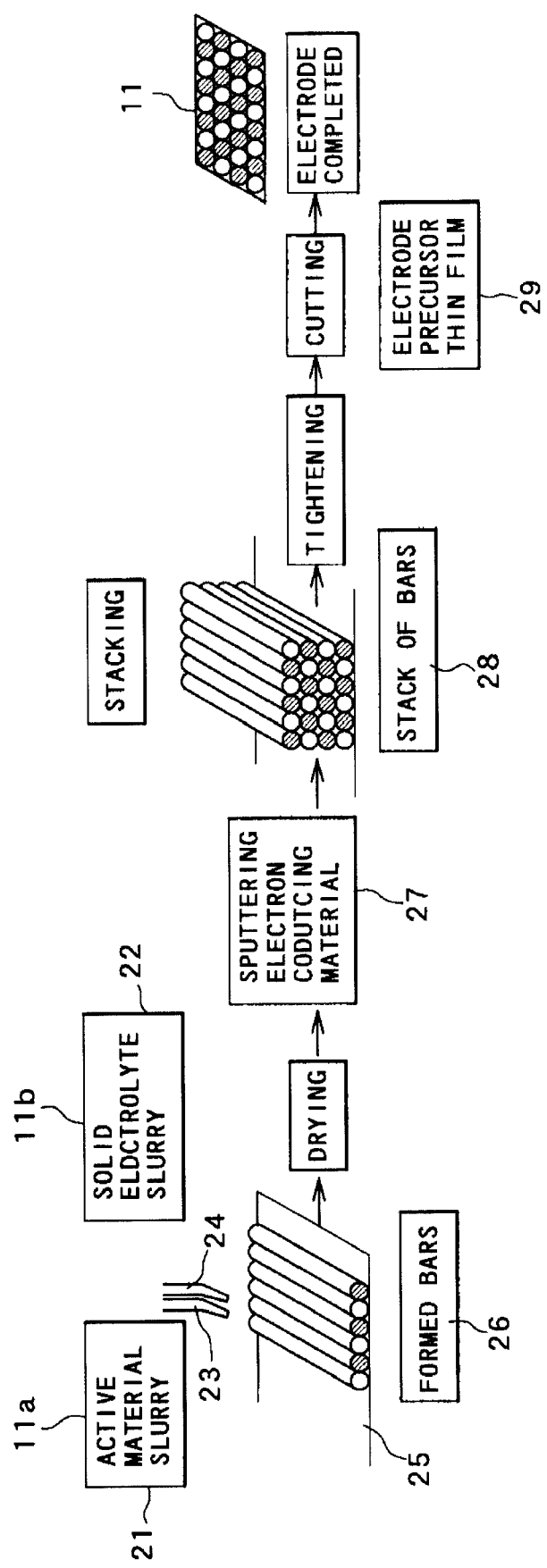
FIG. 3 is a schematic process chart showing an embodiment of the method for manufacturing an electrode according to the invention.
Figure 4:
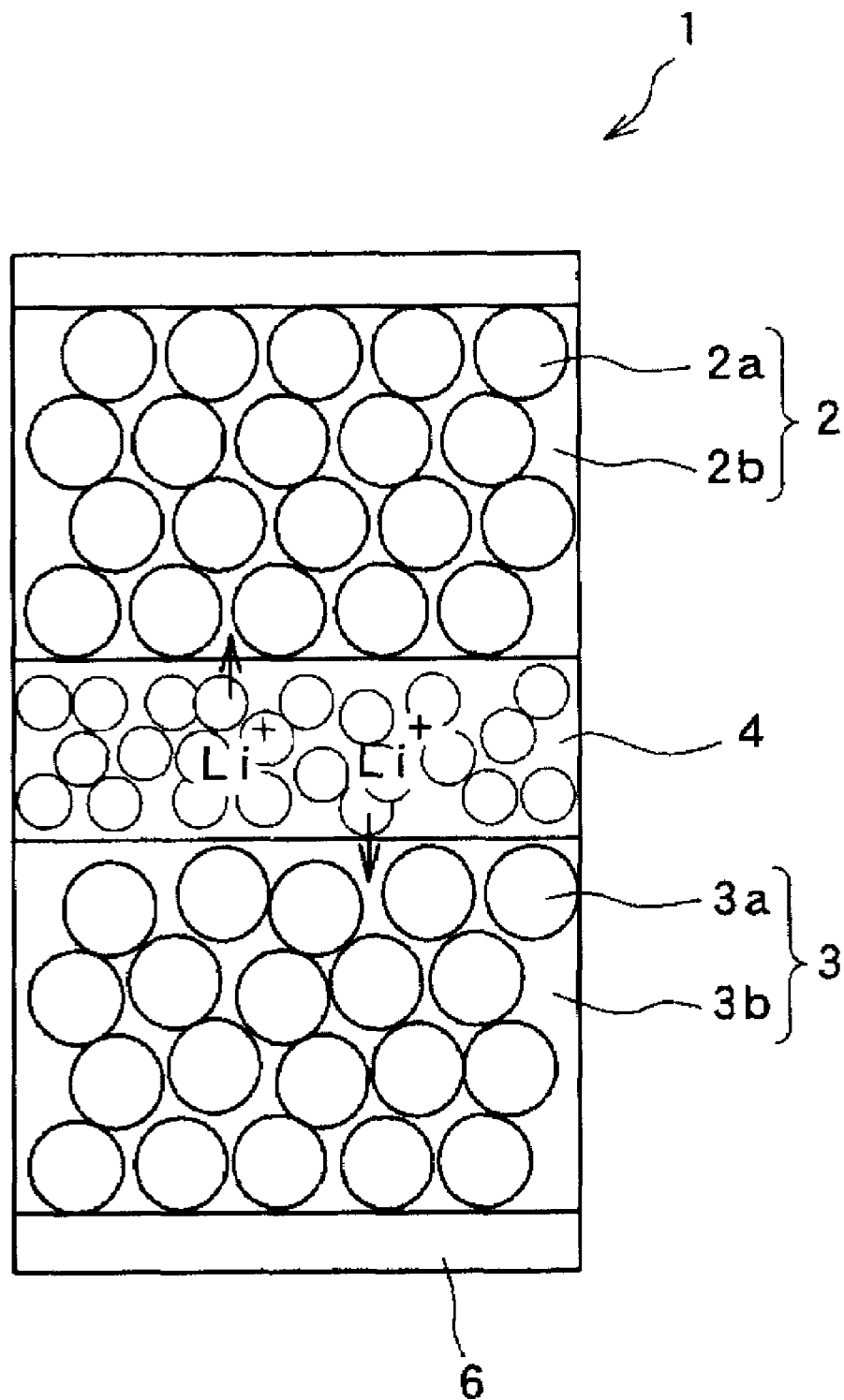
FIG. 4 is an enlarged sectional view of a part of a prior art solid battery.

In the accompanying drawing, FIG. 1A is a schematic sectional view and FIG. 1B shows an enlarged part of FIG. 1A, FIG. 2 is a schematic section showing another embodiment of the solid battery of the invention and FIG. 3 is a schematic process chart showing an embodiment of the method for manufacturing an electrode according to the invention.

A solid battery 10 comprises a positive electrode 11 and a negative electrode 12 opposing each other and being laminated together via a solid electrolyte 13 constituting a separator. A positive electrode current collector 14 is provided on the outer surface of the positive electrode 11 and a negative electrode current collector 15 is provided on the outer surface of the negative electrode 12. This solid battery 10 is constructed as a fully solid lithium ion battery in which all of the positive electrode 11, negative electrode 12, solid electrolyte 13, positive electrode current collector 14 and negative electrode current collector 15 are made of solid materials which are sintered singly or sintered together after being laminated together.

As to the positive electrode 11 and the negative electrode 12 of the solid battery 10, the positive electrode 11 will now be described by way of example. The positive electrode 11 has an active material 11a of the electrode and a solid electrolyte 11b of the electrode as in the prior art solid battery. By having an ion conducting property and an electron conducting property, the positive electrode 11 can store and discharge ion (Li ion) which is necessary for the electrode 11.

In the solid battery 10 of the present invention, the active material 11a of the electrode and the solid electrolyte 11b of the electrode in powdery state are not mixed together but they are formed to bars 16 of the active material of the electrode and bars 17 of the electrolyte of the electrode which are disposed alternately and adjacent to each other. These bars 16 and 17 are disposed on the solid electrolyte 13 constituting the separator in such a manner that the bars 16 and 17 are disposed in a crossing direction to the plane of the electrolyte 13. The active material 16 of the electrode comprises an electron conducting material for securing conduction of electron.

By disposing the bars 16 of the active material of the electrode and the bars 17 of the electrolyte of the electrode alternately and adjacent to each other and in a crossing direction to the plane of the electrolyte 13 constituting the separator, the ion conduction path and the electron conduction path become independent from each other whereby, as shown in FIG. 1B, conduction of ion and electron is improved by avoiding moving of ion and electron through a circuitous path whereby a discharge current which is larger than in the prior art solid battery can be provided.

Therefore, it is most preferable for making the ion conduction path and the electron conduction path shortest to dispose, as shown in FIGS. 1A and 1B, the bars 16 of the active material of the electrode and the bars 17 of the electrolyte of the electrode perpendicularly to the plane of the electrolyte 13 constituting the separator. It will suffice, however, if these bars 16 and 17 are disposed not only perpendicularly but in a crossing direction (non-parallel direction) to the plane of the solid electrolyte constituting the separator.

In the embodiment shown in FIGS. 1A and 1B, the bars 16 of the active material of the electrode and the bars 17 of the electrolyte of the electrode are disposed respectively in contact with the electrolyte 13 and the positive electrode current collector 14. The bars 16 of the active material of the electrode may, as shown in FIG. 2, be disposed in contact at least with the positive electrode current collector 14 while the bars 17 of the electrolyte of the electrode may be disposed in contact at least with the electrolyte 13 constituting the separator. Even by such structure, the ion conduction path and the electron conduction path can be improved whereby a discharge current which is larger than in the prior art solid battery can be derived.

The bars 16 of the active material of the electrode and the bars 17 of the electrolyte of the electrode may have any shape in cross section including a rectangular and a trapezoidal shape so long as the shape in cross section can constitute a cross section of a bar. The bars 16 and 17 may have a shape in cross section which is constant in the axial direction of the bar such as rectangular parallelepiped or which changes in the axial direction of the bar such as a truncated pyramid. In the latter case, it is desirable to dispose the bars 16 of the active material of the electrode having. e.g., a truncated pyramid shape in reverse direction to the bars 17 of the electrolyte of the electrode having, e.g., a truncated pyramid shape.

Since the bars 16 of the active material of the electrode made of powder having a smaller average particle diameter can shorten the distance of diffusion of ion in the active material 11a of the electrode, the active material 11a of the present invention has a smaller average particle diameter than the average particle diameter of the prior art active material of the electrode which is 10 µm. That is, the active material 11a of the electrode is made of powder having an average particle diameter of 1 µm or below and this active material 11a is formed to the electrode 11 by heat treatment such as sintering. By this arrangement, the distance of diffusion of ion in the active material 11a of the electrode is further shortened and discharging at a high current density can thereby be realized. Similarly, the bars 16 of the active material of the electrode and the bars 17 of the electrolyte of the electrode having a smaller area in cross section can enable the electrode to accommodate a larger number of the bars 16 and the bars 17 and thereby increase the area of reaction between the active material 11a and the solid electrolyte 11b and realize discharging at a high current density.

The bars 16 of the active material of the electrode occupies the ratio of 50 vol % or over in the total volume of the bars 16 of the active material of the electrode and the bars 17 of the solid electrolyte of the electrode. By this arrangement, the ion conduction path and the electron conduction path can be surly secured whereby a high current density can be derived and a solid battery having a high current output can be provided.

A method for manufacturing the electrode of the solid battery of the present invention will now be described. Description will be made, by way of example, about a case of manufacturing the positive electrode 11 with reference to the schematic process chart of FIG. 3.

According to this method of manufacturing the positive electrode 11, the positive electrode 11 in which the bars 16 of the active material 11a of the electrode and the bars 17 of the solid electrolyte 11b of the electrode can be disposed alternately and adjacent to each other and in a crossing direction to the plane of the solid electrolyte 13 constituting the separator can be manufactured independently.

Slurry 21 of the active material 11a is prepared by mixing and dispersing powder of the active material 11a of the electrode, a binder, dispersing agent and water and slurry 22 of the solid electrolyte 11b of the electrode is prepared by mixing and dispersing powder of the solid electrolyte 11b, a binder, a dispersing agent, a defoaming agent and water. As the powder of the active material 11a of the electrode, powder having a smaller average particle diameter can increase the diffusion speed of ion in the active material of the electrode and, therefore, powder having an average particle diameter of 1 µm or below is preferably used.

The slurry 21 of the active material 11a of the electrode slurry 22 of the solid electrolyte 11b of the electrode are respectively pushed out of capillaries 23 and 24 onto a release film 25 in a manner to be disposed alternately on the release film 25 to form bars 26. By pushing out the slurries 21 and 22 from the capillaries 23 and 24, a desired shape in cross section such as rectangular shape or trapezoidal shape can be selected according to the shape of the capillaries. Instead of using the capillaries, the bars can be formed by printing the bars.

The bars 16 of the active material of the electrode and the bars 17 of the electrolyte of the electrode are formed in such a manner that the bars 16 of the active material of the electrode occupies the ratio of 50 vol % or over in the total volume of the bars 16 of the active material of the electrode and the bars 17 of the solid electrolyte of the electrode.

The formed bars 26 formed in this manner by disposing the bars 16 of the active material of the electrode and the bars 17 of the solid electrolyte of the electrode alternately are dried.

Then, for enabling the active material 11a of the electrode to comprise an electron conducting material 27, platinum, e.g., is deposited on the formed bars 26 by, e.g., sputtering.

Then, stacking of the formed bars 26 is conducted so that one group of the formed bars 26 disposed in a plane is superposed upon another group of the formed bars 26 to form a three-dimensional stack 28 of bars.

This stack 28 of the bars is formed by folding back the release film 25 to release the bars 16 and 17 in such a manner that the active material 11a of the electrode and the solid electrolyte 11b of the electrolyte are disposed alternately in the vertical direction also.

Instead of forming the stack 28 by folding back the release film 25, the stack 28 having a circular cross section may be formed by rolling the release film 25.

This three-dimensional stack 28 of the bars is tightened by press forming using, e.g., cold isotropic pressure pressing (CIP) to remove voids and pores in the bars.

The stack 28 of the bars thus tightened by press forming is cut in a slice to provide a electrode precursor 29 in the form of a thin film. By heat treating this electrode precursor 29 by, e.g., sintering, an independent electrode 11 is completed.

In the case of sintering the electrode 11 and the solid electrolyte 13 constituting the separator together simultaneously in producing the solid battery 10, the electrode precursor 29 cut to a thin film may be used directly and may be sintered in a subsequent process.

According to this method for manufacturing the electrode of the solid battery, the electrode 11 in which the bars 16 of the active material 11a of the electrode and the bars 17 of the solid electrolyte 11b of the electrode are disposed alternately and adjacent to each other and in a crossing direction to the plane of the solid electrolyte constituting the separator can be produced independently or the electrode precursor can be produced easily.

As the active material 11a used for the positive electrode 11 of the lithium ion solid battery (secondary batter) of the present invention, transition metals which can store and discharge lithium can be used. For example, a compound comprising at least one transition metal selected from the group consisting of Mn, Co, Ni, V, Nb, Mo and Ti may be used. In most active material of the electrode, it is preferable to add, as an electron conducting material, such material as conductive carbon, graphite, carbon fiber, metal powder, metal fiber and electron conductive polymer. In the case of producing the positive electrode by sintering, a material which is not influenced by the sintering temperature should be used. The active material 11a may be added with an ion conductive additive. In this case, ion conductive glass-ceramics, ceramics or amorphous glass may preferably be used. The amount of such electron conducting material and/or ion conductive additive should be preferably within a range from 0.01 mass % to 35 mass %, more preferably within a range from 0.05 mass % to 30 mass % and most preferably within a range from 1 mass % to 25 mass % to the total amount of the positive electrode.

In the lithium ion solid battery (secondary battery) of the invention, as an active material 12a used for the negative electrode 12 may be preferably used materials which can store and discharge lithium such as metal lithium, alloys such as lithium-aluminum alloy and lithium indium alloy, transition metal alloys such as titanium alloy and vanadium alloy, alloys of tin etc., carbon type materials such as graphite. In case the active material 12a of the negative electrode has a poor electron conduction property, it is preferable to add, as an electron conducting material, such materials as conductive carbon, graphite, carbon fiber, metal powder and/or metal fiber. In the case of producing the negative electrode by sintering, a material which is not influenced by the sintering temperature should be used. The active material 12a may be added with an ion conductive additive. In this case, ion conductive glass-ceramics, ceramics or amorphous glass may preferably be used. The amount of such electron conducting material and/or ion conductive additive should be preferably within a range from 0.01 mass % to 35 mass %, more preferably within a range from 0.05 mass % to 30 mass % and most preferably within a range from 1 mass % to 25 mass % to the total amount of the negative electrode.

The ion conductive glass-ceramics and ion conductive polymer to be added to the positive electrode 11 or the negative electrode 12 should preferably be the same glass-ceramics and organic polymer which the solid electrolyte 13 constituting the separator comprises. By using the same material in these components, the ion moving mechanism of the glass-ceramics and the polymer contained in the solid electrolyte 13 constituting the separator and the electrode 11 or 12 is unified whereby movement of ion between the electrolyte 13 and the electrode 11 or 12 is made smoothly and a battery having a high current output and high capacity thereby can be provided.

The thinner is the solid electrolyte 13 in the form of a sheet which is preferable as the separator of the lithium ion solid battery of the invention, the shorter is the moving distance of lithium ion and, as a result, a battery of a higher output can be provided. Further, by making the solid electrolyte 13 thinner, a broader area of the electrode per unit volume can be secured and, as a result, a battery of a higher capacity can be provided. Therefore, thickness of the electrolyte layer used as the solid electrolyte 13 should be preferably 150 μm or below, more preferably 100 μm and most preferably 50 μm or below.

For preventing impairing of the high current output characteristic of the solid battery of the invention, thickness of the electrode of the invention consisting of the bars of the active material of the electrode and the bars of the electrolyte of the electrode should be preferably 250 μm or below, more preferably 200 μm and most preferably 150 μm or below. For increasing the capacity of the battery, the thickness of the electrode should be preferably 10 μm or over, more preferably 30 μm or over and most preferably 50 μm or over.

Mobility of lithium ion during charge and discharge of a lithium ion solid battery (secondary battery) depends upon lithium ion conductivity and lithium ion transport number of the electrolyte. Therefore, it is preferable to use a material having high lithium ion conductivity as the solid electrolyte of the present invention. Ion conductivity of lithium ion conductive ceramics should be preferably $1\times10^{-4}$ S·cm$^{-1}$ or over, more preferably $5\times10^{-4}$ S·cm$^{-1}$ or over and most preferably $1\times10^{-3}$ S·cm$^{-1}$ or over.

Lithium ion conductive inorganic powder used in the solid electrolyte 13 includes lithium ion conductive glass powder, lithium ion conductive crystal (ceramics or glass-ceramics) powder and mixture thereof. For obtaining high lithium ion conductivity, the lithium ion conductive inorganic powder should preferably comprise lithium, silicon, phosphorus and titan as its components. For obtaining higher lithium ion conductivity by comprising a large amount of these elements, the solid electrolyte should preferably comprise crystal of these elements in an amount of 50 wt % or over, more preferably 55 wt % or over and most preferably 60 wt % or over.

By comprising a large amount of such crystal in lithium ion conductive inorganic powder contained in the formed sheet of the solid electrolyte 13, higher ion conductivity can be obtained. Therefore, the lithium ion conductive inorganic powder should preferably comprise the lithium ion conductive crystal in an amount of 50 wt %, more preferably 55 wt % and most preferably 60 wt %.

As the lithium ion conductive crystal to be used, a crystal which does not contain crystal grain boundary which hampers ion conduction can be advantageously used in respect of ion conductivity. As such crystal can be cited a crystal having lithium ion conductive perovskite structure such as LiN, LiSiCON and $La_{0.55}Li_{0.35}TiO_3$, $LiTi_2P_3O_{12}$ having NASICON structure or glass-ceramics which precipitate such crystal. A preferable lithium ion conductive crystal is $Li_{1+x+z}M_x(Ge_{1-y}Ti_y)_{2-x}Si_zP_{3-z}O_{12}$ where $0 \leq x \leq 0.8$, $0 \leq y \leq 1.0$ and $0 \leq z \leq 0.6$, M is one or both of Al and Ga. Since glass-ceramics precipitating crystals having NASICON structure has little void and crystal grain boundary which hamper ion conduction, they have high ion conductivity and excellent chemical durability and, therefore, are particularly preferable. By comprising a large amount of these glass-ceramics in the solid electrolyte, the solid electrolyte should preferably contain lithium ion conductive glass-ceramics in an amount 80 wt % or over, more preferably 85 wt % or over and most preferably 90 wt % or over.

In this specification, the void and crystal grain boundary which hamper ion conduction mean ion conduction hampering elements such as void and crystal grain boundary which reduce the degree of conduction of the entire inorganic substance including the lithium ion conductive crystal to 1/10 of the degree of conduction of lithium ion conductive crystal in the inorganic substance. Glass-ceramics in this specification mean a material which has a crystal phase precipitating in a glass phase and consists of an amorphous solid and crystal. Glass-ceramics include a material in which all of the glass phase is converted to the crystal phase on the condition that substantially no void or crystal grain boundary exists in the glass-ceramics, namely a material in which the degree of crystallization is 100 mass %.

Ceramics and other sintered materials generally cannot avoid occurrence of voids and crystal grain boundary in crystals due to the manufacturing process of such ceramics and sintered materials and glass-ceramics can be distinguished from such ceramics and sintered materials in this respect. Particularly, as regards ion conductivity, ceramics have considerably lower ion conductivity than ion conductivity of their crystal grains themselves due to existence of voids and crystal grain boundary. In glass-ceramics, decrease in conductivity between crystals can be prevented by controlling the crystallizing process whereby conductivity which is substantially equivalent to conductivity of crystal grains themselves can be maintained.

As a material other than glass-ceramics having little voids and crystal grain boundary hampering ion conduction, a single crystal of each of the above described crystals can be cited. Since, however, it is difficult to produce such single crystal and therefore manufacturing cost of such single crystal becomes very high, it is more preferable to use glass-ceramics.

As a lithium ion conductive inorganic powder having high ion conductivity which should be contained in the solid electrolyte 13, it is preferable to use powder obtained by crushing lithium ion conductive glass-ceramics. This lithium ion conductive inorganic powder should preferably be dispersed uniformly throughout the solid electrolyte from the standpoint of ion conductivity and mechanical strength of the solid electrolyte. For improving dispersion, and also for realizing a desired thickness of the solid electrolyte, the lithium ion conductive inorganic powder should preferably an average particle diameter of 20 μm or below, more preferably 15 μm or below and most preferably 10 μm or below.

In the above described lithium ion conductive glass-ceramics, the mother glass comprises, for example, in mol % on oxide basis:

| | |
|---|---|
| $Li_2O$ | 10-25% and |
| $Al_2O_3$ and/or $Ga_2O_3$ | 0.5-15% and |
| $TiO_2$ and/or $GeO_2$ | 25-50% and |
| $SiO_2$ | 0-15% and |
| $P_2O_5$ | 26-40%. |

This mother glass is heat treated for crystallization and the predominant crystal phase of the obtained glass-ceramics is $Li_{1+x+z}M_x(Ge_{1-y}Ti_y)_{2-x}Si_zP_{3-z}O_{12}$ where $0 \leq x \leq 0.8$, $0 \leq y \leq 1.0$ and $0 \leq z \leq 0.6$, M is one or both of Al and Ga.

By this composition, glass can be easily obtained by casting molten glass and glass-ceramics having the above described crystal phase obtained by heat treating this glass have high lithium ion conductivity. In glass-ceramics having a similar composition to the above composition, $Al_2O_3$ may be replaced by $Ga_2O_3$ and $TiO_2$ may be replaced by $GeO_2$. partially or wholly so long as the glass-ceramics have a similar crystal structure. For lowering the melting point of the glass or improving stability of the glass in producing glass-ceramics, other materials may be added in a small amount within a range in which ion conductivity is not deteriorated.

The composition of the glass-ceramics should not preferably comprise alkali metals other than $Li_2O$ such as $Na_2O$ and $K_2O$. When these components exist in the glass-ceramics, conduction of Li ion is obstructed due to a mixing effect of alkali ion with the result that ion conductivity is decreased. When sulfur is added to the composition of the glass-ceramics, lithium ion conductivity is increased to some extent but chemical durability and stability are deteriorated and, therefore, sulfur should not preferably be added. In the composition of the glass-ceramics, components such as Pb, As, Cd and Hg which are likely to have adverse effects to the environment and to human body should not preferably be added.

Lithium ion conductive inorganic powder, i.e., powder of glass or crystal (ceramics or glass-ceramics) having high lithium ion conductivity and chemical stability or powder of mixture of these materials, is mixed with organic binder and, if necessary, a dispersing agent etc. by using a solvent and this mixture is formed to a green sheet by a simple forming process such, for example, as using a doctor blade. The prepared green sheet then is processed to a desired shape, pressed preferably by roll pressing or monoaxial, isotropic pressing. The green sheet then is sintered and an organic component of the organic binder is thereby removed. Thus, a fully solid electrolyte in the form of a thin sheet or any desired shape can be produced.

As the organic binder used for preparing of the green sheet, a binder which is commercially available as a forming additive for a doctor blade may be used. Forming additives other than the one for a doctor blade which are generally used for rubber press and extrusion molding may also be used. More specifically, acrylic resin, ethyl cellulose, polyvinyl butyral, methacrylic resin, urethane resin, butyl methacrylate and vinyl type copolymer, for example, may be used. As other materials than such binder, it is preferable to add a suitable amount of a dispersing agent for improving dispersion of particles and a surfactant for enhancing defoaming during the drying process.

For increasing electron conductivity without hampering lithium ion conductivity, other inorganic powder or organic substance may also be added. Such effect can be achieved by adding a small amount of insulating crystal or glass having a high dielectric property as an inorganic powder. As such materials, $BaTiO_3$, $SrTiO_3$, $Nb_2O_5$ and $LaTiO_3$, for example, can be cited. Since organic substance is removed during sintering, such material may be also used for adjusting viscosity of the slurry during the forming process without causing any problem.

For forming a green sheet, a simple doctor blade, roll coater or die coater may be used. If viscosity is adjusted suitably, a universal type apparatus for blending and extrusion can be used and, therefore, various shapes of solid electrolytes can be produced efficiently and cheaply.

Since the solid electrolyte 13 obtained by sintering directly has the shape of the formed green sheet, it can be processed to any desired shape and, therefore, a solid electrolyte in the form of a thin film or any other shape can be produced and a fully solid lithium ion secondary battery using this solid electrolyte can be produced. Since the solid electrolyte after sintering does not contain an organic substance, it has superior heat resistance property and chemical durability and moreover has no problem to safety and to the environment.

EXAMPLES

Description will now be made about specific examples of the invention by citing a case where the solid battery of the invention is applied to a lithium ion secondary battery. The present invention of course is not limited to these examples but various modifications may be made within the scope of the invention.

Example 1

Production of Powder of Amorphous Oxide Glass

As raw materials, $HaPO_4$, $Al(PO_3)$, $Li_2CO_3$, $SiO_2$ and $TiO_2$ were used. These raw materials were weighed to obtain a composition in mol % on oxide base having 35.0% $P_2O_5$, 7.5% $Al_2O_3$, 15.0% $Li_2O$, 38.0% $TiO_2$ and 4.5% $SiO_2$. The raw materials were mixed uniformly and then put in a platinum pot. The raw materials were heated and melted while being stirred in an electric furnace at 1500° C. for three hours to provide molten glass.

Then, the molten glass was dripped into flowing water at room temperature from a platinum pipe attached to the platinum pot while the molten glass was heated and the molten glass thereby was promptly cooled to provide an oxide glass.

This glass was crystallized in an electric furnace at 1000° C. and lithium ion conductivity was measured. The lithium ion conductivity was $1.3 \times 10^{-3}$ S cm$^{-1}$ at room temperature.

By the powder X-ray diffraction method, the precipitating crystal phase was examined and it was confirmed that $Li_{1+x+y}Al_xTi_{y/2-x}Si_yP_{3-y}O_{12}$ where $0 \leq x \leq 0.4$ and $0 \leq y \leq 0.6$ was a predominant crystal phase.

The oxide glass then was milled by a jet mill and put in a ball mill containing ethanol as a solvent for wet crushing and oxide glass powder having an average particle diameter of 0.3 µm was provided.

Preparation of an Electrolyte Green Sheet

The oxide powder having an average particle diameter of 0.3 µm was mixed and dispersed with an acrylic binder, a dispersing agent and a defoaming agent by using water as a solvent and en electrolyte slurry was prepared. The slurry was subjected to defoaming by reducing pressure and then was formed by using a doctor blade and dried to provide an electrolyte green sheet having thickness of 30 µm.

Preparation of a Positive Electrode Precursor

As a positive electrode active material, commercially available lithium titanate was milled to powder having an average particle diameter of 0.2 µm and this powder was mixed and dispersed with an acrylic binder, and a dispersing agent by using water as a solvent to prepare a positive electrode slurry.

The electrolyte slurry and the positive electrode slurry were respectively formed in the form of a line alternately on a release film through glass capillaries having an inner diameter of 0.2 mm and these alternately disposed lines of slurries were dried.

Then, platinum was deposited on these lines by sputtering and the lines were stacked together by rolling these lines and a stack having a circular cross section was provided. This stack having a circular cross section had an outer diameter of φ12 mm.

This stack having a circular cross section was pressed at a room temperature by using CIP (cold isotropic pressure pressing) for tightening.

The stack having a circular cross section was then cut in a radial direction of the cross section to a thickness of 80 µm to provide a positive electrode precursor.

Preparation of a Positive Electrode-Electrolyte Laminate

A sheet of the positive electrode precursor and a sheet of the electrolyte green sheet thus produced were superposed one upon the other and laminated together by using a hot press at 120° C. and 50 kgf.

The laminate was pressed at a room temperature by using CIP (cold isotropic pressure pressing) for tightening.

The laminate was then held with an alumina setter and heated in an electric furnace at 400° C. to remove organic materials such as a binder and a dispersing agent in the laminate.

Then, the temperature was lifted quickly to 900° C. and the laminate was held there for 5 minutes. Then the laminate was cooled to provide a sintered laminate of a positive electrode and an electrolyte.

A part of the sintered laminate was cut off and polished and observed with a scanning electron microscope made by Hitachi Seisakusho. The bar of the electrolyte of the electrode had a cross section having a width of 9 µm and the bar of the electrolyte of the active material had a cross section having a maximum width of 18 µm.

Preparation of a Solid Battery

Cupper films were formed on both surfaces of the sintered laminate of the positive electrode-electrolyte by sputtering.

Thereafter, Li metal foil was laminated as a negative electrode on the cupper film on the side of the electrolyte which is opposite to the positive electrode and a solid battery thereby was completed.

Output Evaluation

The solid battery was charged up to 2V and discharged to 1V at 0.1 mA, 0.5 mA and 1 mA.

Assuming that discharge capacity was 100% at discharge at 0.1 mA, discharge capacity at 0.5 mA was 97% and discharge capacity at 1 mA was 90%.

Example 2

An electrolyte green sheet was prepared in the same manner as in Example 1.

Preparation of a Positive Electrode Precursor

As a positive electrode active material, lithium manganate made by Honjo Chemical was milled to powder having an average particle diameter of 0.5 µm and this powder was mixed and dispersed with an acrylic binder and a dispersing agent by using water as a solvent to provide a positive electrode slurry.

In the same manner as in Example 1, the electrolyte slurry and the positive electrode slurry were respectively formed in the form of a line alternately on a release film through quarts glass capillaries having an inner diameter of 0.2 mm and these alternately disposed lines of slurries were dried.

Then, platinum was deposited on these lines by sputtering and the lines were stacked together by rolling these lines and a stack having a circular cross section was provided. This stack having a circular cross section had an outer diameter of φ9 mm.

This stack having a circular cross section was pressed at a room temperature by using CIP (cold isotropic pressure pressing) for tightening.

The stack having a circular cross section was then cut in a radial direction of the cross section to a thickness of 80 μm and to provide a positive electrode precursor.

Preparation of a Positive Electrode-Electrolyte Laminate

A positive electrode-electrolyte laminate was produced in the same manner as in Example 1.

A part of the sintered laminate was cut off and polished and observed with a scanning electron microscope made by Hitachi Seisakusho. The bar of the electrolyte of the electrode had a cross section having a width of 10 μm and the bar of the electrolyte of the active material had a cross section having a maximum width of 13 μm.

Preparation of a Solid Battery

An aluminum paste was coated on the positive electrode side of the sintered laminate of the positive electrode and electrolyte by sputtering and the laminate was dried and sintered to provide a positive electrode current collector on the positive electrode.

Then, a Cu thin film was formed by sputtering on the surface of the electrolyte of the sintered laminate and a Li metal foil was attached as a negative electrode to the Cu thin film and a solid battery thereby was completed.

Output Evaluation

The solid battery was charged up to 4.5V and discharged to 1V at 0.1 mA, 0.5 mA and 1 mA.

Assuming that discharge capacity was 100% at discharge at 0.1 mA, discharge capacity at 0.5 mA was 92% and discharge capacity at 1 mA was 84%.

Example 3

Preparation of a Positive Electrode-Electrolyte-Negative Electrode Laminate

A sheet of the negative electrode precursor using lithium titanium and a sheet of the electrolyte green sheet prepared in Example 1 and a sheet of the positive electrode precursor prepared in Example 2 were superposed one upon the other and laminated together by pressing them with a hot press at 120° C. and 50 kgf. The laminate then was pressed at room temperature by using CIP (cold isotropic pressure pressing) for tightening. The laminate then was held with an aluminum setter and heated in an electric furnace at 400° C. for removing organic substance such as a binder and a dispersing agent. Then, the temperature was lifted quickly to 900° C. and the laminate was held there for 5 minutes. Then the laminate was cooled to provide a sintered laminate of a positive electrode, an electrolyte and a negative electrode.

A part of the sintered laminate was cut off and polished and observed with a scanning electron microscope made by Hitachi Seisakusho. The bar of the electrolyte of the electrode had a cross section having a width of 11 μm and the bar of the electrolyte of the active material had a cross section having a maximum width of 16 μm.

Preparation of a Battery

An aluminum paste was coated on the positive electrode side of the sintered laminate and dried and sintered to provide a positive electrode current collector. A cupper paste was coated on the side of the negative electrode of the sintered laminate and dried and sintered to provide a negative electrode current collector.

Output Evaluation

The solid battery was charged up to 3V and discharged to 2V at 0.1 mA, 0.5 mA and 1 mA.

Assuming that discharge capacity was 100% at discharge at 0.1mA, discharge capacity at 0.5 mA was 90% and discharge capacity at 1 mA was 79%.

Comparative Example

As a positive electrode material, commercially available lithium titanate was crushed to powder having an average particle diameter of 0.2 μm and was mixed and dispersed with an acrylic binder and a dispersing agent by using water as a solvent to provide a positive electrode slurry.

This slurry was subjected to defoaming by reducing pressure and formed by using a doctor blade and dried and then was pressed at room temperature by using CIP for tightening. The positive green sheet at that time had thickness of 65 μm.

A positive electrode-electrolyte laminate and a solid battery were produced in the same manner as in Example 1 and output evaluation was conducted.

As a result, discharge capacity at 0.5 mA was 52% and discharge capacity at 1 mA was 10%.

What is claimed is:

1. A solid battery comprising:
   a positive electrode;
   a negative electrode; and
   a solid electrolyte separator;
   wherein at least either one of said positive electrode and negative electrode comprising:
   a plurality of active material bars; and
   a plurality of solid electrolyte bars,
   the active material bars are in contact with a current collector,
   the solid electrolyte bars are in contact with the solid electrolyte separator,
   the active material bars and the solid electrolyte bars are arranged alternately in such a manner that each of the active material bars is disposed adjacent to one of the solid electrolyte bars, and
   the active material bars and the solid electrolyte bars are extending in a direction intersecting a plane of the solid electrolyte separator.

2. A solid battery as defined in claim 1, wherein the active material bars and the solid electrolyte bars have a rectangular or a trapezoidal cross section which is constant or changes in the axial direction of the bars.

3. A solid battery as defined in claim 1, wherein the active material bars and the solid electrolyte bars are arranged perpendicularly to the plane of the solid electrolyte separator.

4. A solid battery as defined in claim 1, wherein the active material bars occupies the ratio of 50 vol % or over to the total volume of the active material bars and the solid electrolyte bars.

5. A solid battery as defined in claim 1, wherein the active material bars are composed of particles having an average particle diameter of 1 μm or below.

6. A solid battery as defined in claim 1, wherein the solid electrolyte bars has a maximum width within a range from 0.03 μm to 60 μm in cross section.

7. A solid battery as defined in claim 1, wherein the active material bars has a maximum width within a range from 0.1 μm to 60 μm in cross section.

8. A solid battery as defined in claim 1, wherein the active material bars comprise an electron conducting material.

9. A solid battery as defined in claim 1, wherein the solid electrolyte bars and the solid electrolyte separator comprise a lithium ion conductive solid electrolyte.

10. A solid battery as defined in claim 9, wherein the lithium ion conductive solid electrolyte comprises crystals of $Li_{1+x+z}M_x(Ge_{1-y}Ti_y)_{2-x}Si_zP_{3-z}O_{12}$ where $0 \leq x \leq 0.8$, $0 \leq y \leq 1.0$ and $0 \leq z \leq 0.6$, M is one or both of Al and Ga.

11. A solid battery as defined in claim 9, wherein the lithium ion conductive solid electrolyte comprises glass-ceramics comprising crystals of $Li_{1+x+z}M_x(Ge_{1-y}Ti_y)_{2-x}Si_zP_{3-z}O_{12}$ where $0 \leq x \leq 0.8$, $0 \leq y \leq 1.0$, and $0 \leq z \leq 0.6$, M is one or both of Al and Ga.

12. A solid battery as defined in claim 1, wherein the solid battery is a lithium ion secondary battery.

13. A method for manufacturing an electrode of a solid battery comprising active material bars and solid electrolyte bars arranged alternately in such a manner that each of the active material bars is disposed adjacent to one of the solid electrolyte bars, the active material bars and the the solid electrolyte bars are disposed in a crossing direction to a plane of a solid electrolyte separator, said method comprising steps of:
   forming a slurry of the active material and a slurry of the electrolyte respectively in the shape of a bar alternately and adjacent to each other;
   drying the slurries; and
   densifying the slurries.

14. A method for manufacturing an electrode of a solid battery comprising active material bars and solid electrolyte bars arranged alternately in such a manner that each of the active material bars is disposed adjacent to one of the solid electrolyte bars, the active material bars and the the solid electrolyte bars are disposed in a crossing direction to a plane of a solid electrolyte separator, said method comprising steps of:
   forming a slurry of the active material and a slurry of the solid electrolyte respectively in a shape of a bar alternately and adjacent to each other on a release film;
   drying the slurries, thereby obtaining active material bars and solid electrolyte bars; and
   stacking the active materials bars and the solid electrolyte bars alternately and adjacent to each other, thereby obtaining a stack of the bars;
   densifying the stack of the bars; and
   cutting the stack of the bars to form the electrode.

15. A method for manufacturing an electrode of a solid battery as defined in claim 14, wherein said stacking the active materials bars and the solid electrolyte bars is made in such a manner that one layer of rows of the bars is superposed upon another layer of the rows of the active material bars and solid electrolyte bars by folding back or rolling the rows of the bars.

16. A method for manufacturing an electrode of a solid battery as defined in claim 14, wherein forming of the shape of the bar on the release film is made by printing.

17. A method for manufacturing en electrode of a solid battery as defined in claim 13, wherein the slurries of the active material are densified by heat treating the slurries, and the slurries comprises particles having an average particle diameter of 1 μm or below.

* * * * *